United States Patent [19]

List et al.

[11] 3,907,709

[45] Sept. 23, 1975

[54] ESTERIFICATION CATALYSTS

[75] Inventors: Ferdinand List; Kurt Wember, both of Marl, Germany

[73] Assignee: Chemische Werke Hüls Aktiengesellschaft, Germany

[22] Filed: Aug. 20, 1973

[21] Appl. No.: 389,793

[30] Foreign Application Priority Data

Sept. 2, 1972 Germany............................ 2243240

[52] U.S. Cl. ................ 252/453; 252/452; 252/454; 252/455 R; 252/457
[51] Int. Cl. ...................... B01j 11/40; C01b 33/70
[58] Field of Search........ 252/453, 452, 454, 455 R, 252/457

[56] References Cited
UNITED STATES PATENTS

| | | | |
|---|---|---|---|
| 3,520,828 | 7/1970 | Rosinski | 252/453 |
| 3,558,508 | 1/1971 | Keith et al. | 252/453 X |
| 3,801,515 | 4/1974 | Olson | 252/453 |

*Primary Examiner*—Paul F. Shaver
*Attorney, Agent, or Firm*—Gilbert L. Wells

[57] ABSTRACT

Silica gel esterification catalysts which are mechanically stable and are highly abrasion free, particularly suitable for the esterification of dimethyl terephthalate, are prepared by impregnating silica gel in solutions of aluminum, titanium, zinc and tin compounds, separating the excess solutions and drying at elevated temperatures. The catalysts are further improved by treatment with a gaseous mixture of methanol and water.

14 Claims, 2 Drawing Figures

ESTERIFICATION CATALYSTS

CROSS REFERENCES TO RELATED APPLICATIONS

Applicants claim priority under 35 U.S.C. 119 for Application Ser. No. P 22 43 240.2, filed Sept. 2, 1972 in the Patent Office of the Federal Republic of Germany. The disclosure of copending Application Ser. No. 361,597, filed May 18, 1973 of Horst Dieter Wulf et al, entitled "Dimethyl Terephthalate Prepared by the Esterification of Terephthalic Acid" is incorporated herein. This copending application discloses the state of the art of the esterification of terephthalic acid with methanol.

BACKGROUND OF THE INVENTION

The field of the invention is silica gel esterification catalysts.

The state of the art of preparing esters of carboxylic acids in the presence of silica gel catalysts may be ascertained by reference to U.S. Pat. Nos. 3,364,251 and 3,617,226, and British Pat. No. 1,053,164. The state of the art of preparing silica gel catalysts may be ascertained by reference to the Kirk-Othmer "Encyclopedia of Chemical Technology," 2nd Ed., Vol. 18 (1969), pages 61–72, under the section "Silica" (Amorphous), and by reference to U.S. Pat. 2,384,946 of Milton M. Marisic, 2,900,349 of Albert B. Schwartz, and 3,642,659 of Ludwig Dorn et al, French Pat. 2,010,775, published Feb. 20, 1970, and West German Application 1,187,588 of Gerhard Heinze et al, published Feb. 25, 1965 and 2,100,220 of Ernst Podschus, published July 27, 1972.

U.S. Pat. 2,384,946 discloses the preparation of a body of catalyst pellets comprising hard homogeneous porous dried gel particles bounded by smooth hard glossy surfaces consisting substantially of smooth curves and characterized by a high resistance to attrition loss, said particles having been produced by forming a hydrosol or inorganic oxide characterized by an inherent capacity of set to a hydrogel upon the lapse of a suitable period of time without addition to or subtraction from said sol of any substance, admitting said sol in the form of separate globules to a body of fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, washing the spheroidal hydrogel and drying the washed hydrogel.

According to U.S. Pat. No. 3,642,659 porous, abrasionresistant bread-like catalyst supports containing in a matrix of a silicon dioxide gel mixed with 0.1 to 3 percent by weight of hydrated magnesium oxide (a) silicon dioxide filler with a specific surface area of 20 to 200 m²/g in quantities of from 20 to 60 percent by weight and (b) an argillaceous mineral selected from the group consisting of kaolinite, montmorillonite and attapulgite in quantities of from 5 to 30 percent by weight, both quantities based on total contained solids are produced by suspending a solid in an aqueous stable silicon dioxide sol with a specific surface area of 150 to 400 m²/g, which solid comprises (a) a silicon dioxide filler with a specific surface area of from 20 to 200 m²/g in quantities of from 20 to 60 percent by weight and (b) an argillaceous mineral selected from the group consisting of kaolinite, montmorillonite and attapulgite in quantities of from 5 to 30 percent by weight, based on the total solids in the sol; mixing the resulting suspension with hydrated magnesium oxide in quantities of from 0.1 to 3 percent by weight based on the total solids in the sol; dividing the resulting gelable mixture in droplet form in a water-immiscible liquid to effect gelation of the droplets; separating the dry solid material from the liquid and drying and heating the resulting bead-like granulated material for at least ten minutes at temperatures of from 500° to 1,000°C.

An object of the present invention is active, highly abrasion-free and mechanically stable silica gel esterification catalysts.

Esterification catalysts based on silicic acid are well known. Especially effective is the esterificiation of terephthalic acid with methanol in the presence of such esterification catalysts, since terephthalic acid has an unusually high melting point, but is chemically only slightly active and moreover is very difficult to dissolve in the usual solvents. These usual solvents include the low aliphatic alcohols. Accordingly, the esterification of terephthalic acid is more complex than that of the other benzenedicarboxylic acids, and, therefore, a special need exists for a suitable esterification method.

It is, e.g., also very difficult to esterify trimethyl adipic acid, since here we have a combination of a difficult reaction because of a structural limitation, and a thermal instability. Over 200°C, a rapidly increasing decarboxylation sets in.

Thus, West German Pat. 1,090,641 of Wilton H. Lind discloses the esterification of gaseous terephthalic acid with gaseous methanol in the presence of pulverulent silicic acid at a temperature of approximately 300°C. West German Patent 1,188,580 and the corresponding British Patent No. 1,053,164 disclose also the esterification of gaseous terephthalic acid with gaseous methanol in a bed of solids filled with silicic acid in particle form, whereby the favorable method of charging the stream of methanol vapor with gaseous terephthalic acid permits a largely arbitrary standard of the molar ratio of terephthalic acid:alcohol. West German Pat. No. 1,088,474 corresponding to U.S. Pat. No. 3,364,251 teaches the reaction of pulverulent terephthalic acid with gaseous methanol in a fluidized bed of solids made up of pulverulent esterification catalysts such as silicates, hydroxides, oxides or phosphates. The fluidized bed is swirled up by a carrier gas. According to West German Pat. 1,224,313 corresponding to U.S. Pat. 3,617,226, the esterification of pulverulent terephthalic acid with gaseous methanol in the presence of silica gel in particle form succeeds in a rotary furnace whereby this esterification method, unlike the fluidized-bed process, is not bound or limited by particular gas velocities. West German Pat. Application No. 1,933,946 published Jan. 21, 1971 and corresponding to U.S. Pat. Application Ser. No. 39,761, filed May 22, 1970, inserts a rotary tube provided with a blade construction and heating surfaces into the fluidized oven bed. Herein, pulverized terephthalic acid with gaseous methanol is finely dispersed by a blowing action, and this mixture is immediately led through a bed of solids with an esterification catalyst in particle form, whereby any desired throughput can be managed, i.e., the speed and the staying times are optionally variable.

This esterification method with solid esterification catalysts, whereby the use of particulate silicic acid proves to be very advantageous, overcomes the main difficulties of the usual terephthalic acid esterification, as e.g., discontinuous operation methods, corrosion through acid catalysts, extremely long reaction times, alcohol decomposition through formation of ether and olefines and expenditure of high pressure apparatus. Rather, the esterification in the presence of silicic acid can be accomplished continuously and without pressure, whereby the reaction expires in a few seconds. The silicic acid method works with very high temperature reactions, and since the average staying time of the reaction products amounts to only a few seconds, no thermal decomposition occurs. Thereby, the end product which results from the synthesis with practically theorectical output is very pure.

Now, it is a general principle applicable to this $SiO_2$ process that the catalyzation output is direct function of the active surface of the silicic acid contact and that the size and distribution of pores is a great depending factor. This means that the particularly active silica gel varieties used are those that have the largest inner surface formed by the capillary walls, and these are the varieties that are commercially described as fine-pored.

As a disadvantage in the above-mentioned esterification process which takes place in the presence of silicic acid, the decomposition or the abrasion of particulate silicic acid is seen. The small particles of silica gel undergo abrasion which, in the rotary furnace, in the fluidized bed and in the bed of solids, are moved either by the gas stream or also mechanically. In addition to that, the silica gel particles disintegrate under the esterification conditions, i.e., especially at high temperature and when water is present. This reaction is particularly observed when the fine-pored silica gel verieties are used which have a large inner surface and are, therefore, particularly active. The result is that, with a continuous process, fine contact dust settles in the contact bed and this leads to channel formation and, therefore, results in a no larger homogeneous distribution of the gas stream. Simultaneously, after a longer continuous time, an increase in gas resistance occurs in the contact bed and in the after-reactor system.

The above-mentioned limitations which are caused by particle decomposition, particle dust respectively of the silica gel contact in particle form, can largely be overcome by replacing fragmented silica gels with manufactured materials such as cylindrical materials which are made according to an arbitrary formation process of pure silicated brine after dehydration and, if necessary, calcination, are preserved in solid, dry active form (e.g., see Ullman, "Encyclopedia der technischen Chemie," Vol. 15, pp. 723–724 (1964), and are subsequently subjected to an aftertreatment for the hardening of the surface. This aftertreatment, as described in West German Pat. No. 1,667,430 and corresponding French Pat. No. 1,585,305 consists of periodically treating the gel particles with alcohol vapors which can contain small portions of water or acetic acid, when the temperature is increased.

It is also known that the abrasion resistance of the manufactured silica gels can really be increased by dispersing finely divided solid admixed materials in the silicic acid-hydrosol used in the production of the gel (West German Pat. No. 1,096,336), whereby admixed materials with an average particle diameter of between 1 and 5 u are used. Suitable as such admixed materials are oxide gels, but also sand, soot, clay, graphite, metals, oxides, silicates, phosphates, fluorides, sulfides, carbides, and several inorganic compounds. Hereby, however, there is no limitation to only very definite particle sizes of the admixed materials, but it is generally a matter of materials that are chemically different from the hydrosol and, therefore, in catalytic processes, often yield undesirable reaction characteristics. But above all, the inner surfaces of these gels, which decisively affect the activity of the catalyst, are greatly reduced. The esterification activity of these very abrasion-proof silica gels is therefore, very slight. When this deficiency is compensated for by increasing the temperatures over 330°C, then we see more and more side reactions, especially a methanol splitting with formation of dimethylether which, at temperatures over 340°C, further disintegrates with formation of formic aldehyde and methane. Finally, under esterification conditions and with increased temperature these by-products form carbon, whereby the durability and the activity of the catalyst are decisively and disadvantageously affected.

Also, West German Pat. No. 1,767,754 corresponding to French Pat. No. 2,010,775, published Feb. 20, 1970 and U.S. Pat. No. 3,642,659 discloses the formation of such spherical silica gels which are distinguished by an extremely high mechanical strength, i.e., breaking strength and abrasion resistance, and additionally by a high thermal stability. These pearl granules are produced according to the well known sol/gel process; by suspending solid substances in an aqueous, stable silicon dioxide sol with a specific surface of from 150 to 400 $m^2/g$ according to BET; by mixing the suspension obtained with an aqueous paste of hydrated magnesium oxide in quantities of from 0.1 to 3 percent by weight of MgO, relative to the water-free granule; by dividing this gellable mixture into drops of the required size; by gelling these drops in a water immiscible liquid; by separating the granule from the liquid; by drying and calcining, whereby suspended in the silicon dioxide sol are a silicon dioxide containing filler with a specific surface of from 20 to 200 $m^2/g$ according to BET in quantities of from 20 to 60 percent by weight relative to the dry granule, and argillaceous material from the group of kaolinites, montmorillonites and attapulgites in quantities of from 5 to 30 percent by weight. The suspension acquired is gelled to a bead-like granular material by adding hydrated finely divided magnesium oxide and the dispersion of the suspension in droplet form in water-immiscible medium, and the granule is subsequently dried and hardened from at least 10 minutes at a temperature of 500° to 1000°C. Therefore, amorphous silica- or silicate fillers may be used as pore-filling frame substances, whereby the supporting effect of the fillers on the gel is enhanced by relatively little addition of argillaceous materials.

BRIEF DESCRIPTION OF THE DRAWINGS

The appended drawings illustrate apparatus useful in the present invention, wherein.

COMPARISON TESTS FOR SILICA GEL CATALYSTS

Figure 1:
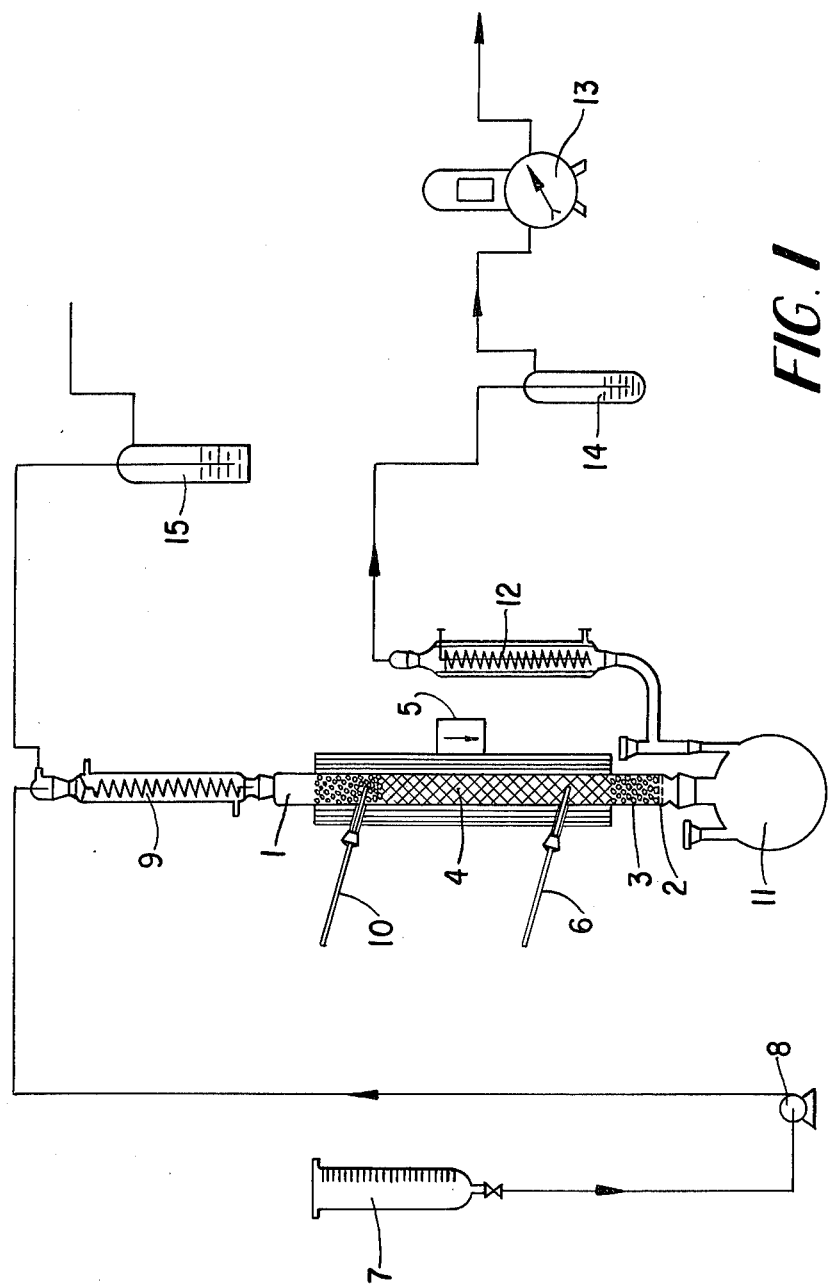
FIG. 1 is a diagrammatic representation of a simplified esterification apparatus of the prior art.

The comparison given below of physical data shows, however, that the porosity and, therefore, the specific surface of these mechanically very strong materials are substantially smaller than those of the fine-pored types; and that according to experience, extremely great strength of material is only possible by limiting the porosity, and, therefore, both silica gel types have different esterification activities.

| Physical Data: | Commercial silica gel, in particles, fine-pored, 1–3 mm (Grace-Silica-Gel, type 125) | Silica gel, spherically made Fr. Patent 2,010,775 1–3 mm |
| --- | --- | --- |
| special surface m²/g | 800 | 110 |
| pore volume ml/g | 0.45 | 0.45 to 0.60 |
| φ pore diameter A | 20 | 150 |
| bulk weight kg/h | 0.7 to 0.75 | 0.65 |
| annealing loss (600°C)—% | 6.5 to 7.5* | <1 |

*The fine-pored silica gel contains 6.5 to 7.5% water of constitution which is necessary for the construction of the porous structure and cannot be removed without loss of the essential properties of the gel (especially the large, specific surface). Therefore, it is not possible to reactivate by calcining or annealing at 600° to 650°C, these fine-pored silica gels unlike the thermally and mechanically very stable silicic pearl granules with filling material.

Abrasion:

Method: On a shaking machine of the Strohlein system, 100 cm³ catalyst is shaken in a 500 cm³ glass bottle at a lifting height of 100 mm and 180 lifts per minute, for 24 hours:

| | Commercial silica gel, in particles, fine-pored, 1–3 mm (Grace-Silica-Gel, type 125) | Silica gel, spherically made Fr. Patent 2,010,775 1 to 3 mm |
| --- | --- | --- |
| Abrasion % | 16.57 | 0.3 |

Method (FIG. 1): A vertical tube 1, diameter: 60 mm, length: 500 mm, with a filter plate 2 whereupon is located a layer of "Raschig" rings or glass beads 3, is filled with a mixture of 100 g terephthalic acid and 240 g silica gel catalyst 4. The tube is heated with an electric heater 5. At a temperature of 300°C (thermometer:6), 100 g methanol is fed in, within 12 minutes, from a reservoir 7 by way of a piston metering pump 8. In the pre-heated 9, heated with a heat transfer oil, the methanol is evaporated and heated to approximately 140°C. Next, the gas stream is superheated to 300°C (thermometer:10) in the upper part of the reaction tube which is also filled with Raschig rings or glass beads. The discharge is caught in the funnel flask 11, and the boiling methanol is condensed in the cooler 12. The amount of the eventually appearing, low-boiling cleavage products is measured in the rear position gasmeter 13. Liquid vapor traps 14 and 15 condense entrained vapors.

| Solids in the | | Silica gel, in particles, fine-pored, 1–3 mm (Grace-Silica-Gel, type 125) | Silica gel, spherically made Fr. Patent 2,010,775 1 to 3 mm |
| --- | --- | --- | --- |
| Discharge | g | 70.5 | 19 |
| SZ | mg KOH/g | 115 | 150 |
| DMT | %-weight | 62.92 | 52.7 |
| MMT | %-w | 37.08 | 47.3 |
| TPS | %-w | — | — |
| DMT | g | 44.4 | 10.0 |
| MMT | g | 26.1 | 9.0 |
| TPS | g | — | — |
| Waste gas (dimethyl ether) | l | 4 | 4 |

DMT=Terephthalic acid dimethyl ether
MMT=Terephthalic acid monomethylester
TPS=Terephthalic acid
SZ=Acid Number

Water sensitivity:

Method: 100 g catalyst is covered with 300 cm³ water and left standing for 30 minutes at room temperature.

| | | |
| --- | --- | --- |
| Particle decomposition in % | 54 | 0 |
| Esterification activity: | | |

Experimental findings further confirm that the esterification activity of the silica gel catalysts depends on the specific surface of the material and that, therefore, the mechanically and thermally very stable silica gel types are unsuitable as esterification catalysts. To be sure, the presence of filler materials, especially of $Al_2O_3$ which is present in a concentration of 8 percent. does not, by the observed experimental temperature (300°C), produce any methanol division in the direction of dimethyl ether formation. This, indeed, happens very much when we try to overcome the inactivity of the catalyst by raising the temperature (>340°C).

Still needed, therefore, are available esterification catalysts, especially based on silicic acid, that are both highly abrasion-free and also highly active.

Therefore, it is the task of the present invention to come up with catalysts which overcome the deficiency of those catalysts, especially for the esterification of terephthalic acid with methanol, particularly with pear-shaped and spherical silica gel catalysts, preferably such as are produced according to the methods of West German Pat. No. 1,096,336 of Albert B. Schwartz, corresponding to U.S. Pat. No. 2,900,349 and West German Application 1,767,754, corresponding to French Pat. No. 2,010,775, published Feb. 20, 1970 and which catalyze particularly the esterification of gaseous or pulverulent terephthalic acid with gaseous methanol in a fluidized bed, a bed of solids or rotary oven or also a combination of same.

SUMMARY OF THE INVENTION

The present invention solves the problem of the limitations of prior art silica gel catalysts by saturating the shaped silica gel esterification catalysts with dissolved compounds of aluminum, titanium, zinc, and tin, by separating them from the excess solution, and by, if necessary, drying them in a vacuum at a raised temperature.

DESCRIPTION OF THE PREFERRED EMBODIMENTS

As shaped silica gel catalysts every natural or synthetic porous-amorphous, in-hard-form-existing silica gel is appropriate which is produced, e.g., from the silicic hydrosols (waterglass) according to known gelling processes (deposition with mineral acids) with follow-up drying, especially pearl-shaped and spherical ones, and, above all, the ones that are acquired according to the methods of U.S. Pat. No. 2,900,349 and French Pat. No. 2,010,775.

According to Chemical Abstracts, Vol. 74, p. 57,741 (1971), French Pat. No. 2,010,775 discloses that suitable catalyst supports, e.g. containing 3 – 10 wt. % of $V_2O_2$ for transformation of $SO_2$ to $SO_3$ in a fluidized bed, are porous $SiO_2$-based beads which are resistant to abrasion and can be impregnated with metal salts or mineral acids without losing mechanical resistance and having no catalytic effects of their own, e.g. to cause cracking reactions. The beads are prepared by making a suspension of 35 – 50 weight percent solid siliceous substance with specific surface of 20 – 200 m²/g (BET) and 15 – 25 weight percent of an argillaceous substance in a stable $SiO_2$ sol with a specific surface of 150 – 400 m²/g and containing 15 – 40 percent $SiO_2$. The resulting suspension is mixed with 0.1 – 3 weight percent aqueous dispersion of fine particles of MgO with a specific surface of 50 m²/g; the gelifiable mixture is dispersed in drops of the required size in a liquid not miscible with $H_2O$ where the change sol to gel takes place. Very small drops for catalyst supports for fluidized beds are dispersed centrifugally. The granules are separated, dried, and calcined for 10 minutes at 500° – 1000°. The siliceous substances with a large specific surface are obtained by precipitation with acid. A small amount of metallic oxide is formed as an impurity. When alkaline earth or Al salts are used for the precipitation, the product contains some CaO or $Al_2O_3$. Suitable argillaceous material are purified kaolinite, montmorillonite, and especially attapulgite. These augment the mechanical resistance of the final calcined product but also give wet strength to the granules. On drying, granules containing >5 percent of kaolinite or attapulgite show less shrinkage which would cause tension and cracks in the dry product. Suitable organic liquids immiscible with $H_2O$ are perchloroethylene, trichloroethylene, orthodichlorobenzene, or mixtures of these. A beaded granule maintained its resistance to abrasion until charged with 25 parts $H_3PO_4$ per 100 parts of anhydride support. Mechanical resistance was not diminished by impregnation with a strongly alkaline solution of K vanadate even through partial dissolution of silica gel supports was expected.

As compounds of aluminum, titanium, zinc and tin the following are suitable: sodium aluminate, potassium aluminate, titanic ester (such as, for example, titanic tetraethyl ester, tetrapropyl ester, tetraisopropyl ester, tetrabutyl ester, etc.), tin tetraacetate, stannic tetraethyl ester, zinc acetate; i.e., those compounds which, under customary esterification conditions (namely raised temperature in the presence of reaction water) or by the later-on described gasing of the contact, produce oxidic or hydroxidic groups. The alcoholates of the tetravalent titanium and tin are to be understood as ortho esters of the acid metallic hydroxides concerned and are technically closely related to the esters of silicic acid. They are hydrolytically split by $H_2O$, whereby the hydrolytic charge becomes less and less with the lengthening of the chain.

Suitable aluminum compounds include sodium aluminate, potassium aluminate, aluminum organic compounds 3 to 18 carbon atoms, especially aluminum alkyles as trimethyl aluminum, triethyl aluminum, tri-iso- or n-propyl aluminum, the tributyl aluminums, the trimethyl etherate aluminum $Al(CH_3)_3 \cdot (C_2H_5)_2O$, the triethyl etherate aluminum $Al(C_2H_5)_3 \cdot (C_2A_5)_2O$, the tripropyl etherate aluminum $Al(C_3H_7)_3 \cdot (C_2A_5)_2O$, the aluminum aryles as triphenyl aluminum, tri-p-tolyl aluminum and their etherates, and mixed compounds as the lithium aluminum esters of lower alcohols as methanol, ethanol, the propanols and the butanols.

Suitable titanium organic compounds having 4 to 24 carbon atoms include esters as titanic tetramethyl ester, titanic tetraethyl ester, titanic tetrapropyl ester, titanic tetraisopropyl ester, the titanic tetrabutyl esters, the following ester up to the titanic tetrastearyl esters including esters from iso-alcohols as the titanic 2-ethylhexyl ester, esters from polyvalent alcohols as the titanic ethylglycol ester, complex esters as Na H Ti(O $C_4 H_9)_6$ and organic titanic compounds, especially tetraalkyl titanium as tetraisopropylic titanium. Suitable zinc organic compounds having 2 to 12 carbon atoms include zinc acetate, zinc propionate and zinc butyrate, complex zinc compounds, especially with β-diketones as acetyl acetone, 2,4-hexandione, 3,5-heptandione, isopropyl acetylacetone, 3,5-octandione, isobutyl acetone, 4,6-nonandione and other compounds which form chelates with zinc; also suitable are organic zinc compounds as zinc alkyl, zinc aryl and mixed compounds, zinc dimethyl, zinc diethyl, the zinc dipropyls, the zinc dibutyls and the zinc diamyls (preferably the iso-alkyles), ethyl-n-propyl zinc, ethylisobutyl zinc, n-propyl-isobutyl zinc, isobutyl-isoamyl zinc, zinc diphenyl, zinc ditolyl and zinc betanaphthyl.

Suitable tin compounds include organic tin compounds having 4 to 24 carbon atoms, esters, mixed compounds and products of hydrolyses thereof and stannic acid esters. Suitable are tin tetramethyl, tin tetraethyl, the tin tetrapropyls up to the tin tetraoctyls, tin tetraacetate, tin tetrapropionate and tin tetrabutyrate, tin trimethylethyl, tin trimethylpropyl, tin triethylpropyl, tin triethylisopropyl, tin tri-n-propyl-isobutyl, tin tri-n-amyl-n-propyl etc., tin tetraphenyl, tin tetratolyl, tin tetraxylyl, $(C_4H_9)_3$ Sn OH, $(C_4H_9)_2$ SnO, $(C_4H_9)_2$ Sn $(OOC . CH_3)_2$, $(C_4H_9)_2$ Sn $OCH_3$ and $(C_4H_9)_3$ SnO . $C_2H_5$.

These and similar compounds are suitably used in dilute solutions, whereby the solvents must be fully inert in contrast to the catalyst compounds. The titanic and stannic esters used are, for example, extremely sensitive to water. Therefore, the use of water is excluded in this case. Instead, hydrocarbons such as n-hexane, heptane, etc., or alcohols such as methanol, butananl are used herein. In order, on the other hand, to assure a good dosing and, on the other, to avoid a deposition out of the solution, which could occur by inserting titanic or stannic ester in the presence of air, it is necessary to use not too high a concentration in the solution. The solutions should contain the compounds in from 0.01 to 8, preferably 0.1 to 5, and specifically 0.2 to 2.5 percent by weight of metal.

The amount of the solutions can greatly vary. The added solution must, however, completely cover the to be saturated catalyst layer during the entire impregnation process. The ratio is, naturally, dependent upon the specific weight of the solvent and upon the loose weight of the silica gel catalyst.

Generally, the proportion by weight of the solution to the catalyst is, for example 2:1, especially 1.5:1, and most preferably 1.25:1.

Examples of the overall combination of compounds of aluminum, titanium, zinc or tin : solvent : catalyst in parts by weight include 0.5 to 50, especially 1.5 to 30 parts by weight of the metal : 1,000 parts by weight of the solvent : 400 to 1,200, especially 600 to 1,000 parts by weight of the catalyst.

The saturation can take place in the temperature range of from 10° to 50°C under agitation and if necessary in a vacuum chamber. In the preferred form, it is sufficient to cover over the stationary pearl catalyst layer with the solution, and to let it stand for 3 to 15 hours. The discharge of the impregnant can periodically be followed by measuring the decrease of the catalyst concentration in the impregnating solution. For example, the titanium content decreases from originally 2.07 percent to 0.01 percent within 6 hours, when the silica gel pearl catalyst is activated according to French Pat. No. 2,010,775, with a solution of titanic tetrapropylate in hexane.

After the saturation, the catalyst solution is poured off the impregnated contact. After increasing the concentration of the catalyst salts, this impregnation solution can be charged again. The pearl catalyst wet with beaded moisture is subsequently dried at increased temperature, if necessary, in a vacuum, until the solvent is removed.

In a preferential product form, after the drying, the steamed-up pearls are heated, in a suitable way, by rotation in the rotary oven at slowly rising temperatures up to 150°C, and are gassed with a steam mixture of methanol and water (proportion by weight 3:1) which is superheated up to 150°C, whereby, per hour, 1 part of catalyst by weight to 0.5 part of gas mixture by weight are injected. After 0.5 to 5 hours, preferably 1 to 4 hours, particularly 1.5 to 2.5 hours, the aftertreatment is finished.

The metal of the impregnated silica gel catalyst is presumably connected to the catalyst by means of silanole groups —Si—OH or similar active groups which are able to undergo chemical reactions with the previously formed products of hydrolysis.

The concentration in weight percent of the metal of the aluminum, titanium, zinc or tin compounds based on the weight of the silica gel catalyst base is about 0,1 to 5 and preferably 0,2 to 2,5 .

It is surprising that the mechanically very stable, but little active pearl catalyst bases can be used in such a simple manner without changing the prominent mechanical and thermal characteristics. It is, namely, not at all self-evident that the compounds added which, as we known, under proper conditions can catalyze the esterification in a fluid phase, are also appropriate to catalyze the esterification reaction of solid terephthalic acid with gaseous methanol under fully different physical conditions. In the literature which specifically deals with the esterification of solid terephthalic acid with gaseous methanol (Nowotny, "Erdöl und Kohle", 1969, pp. 707–710), it is explained that the use of salts of a heavy metal, which in the esterification techinque are generally known as catalysts, especially phosphate and oxides such as zinc phosphate, zinc oxide, zinc borate, borophosphate, lead to little improvement in the esterification of solid terephthalic acid with gaseous methanol. The improvement, if any, only leads to monomethyleterephthalate. Here it is emphasized that, according to Table 1 of the present invention, also the esterification in the presence of $TiO_2$ leads only to the monomethylterephthalate step. Also the saturation of carrier materials, such as silica gels, with these esterification catalysts leads to dissatisfactory changes compared to the pure silica gels, according to Table 3 of the present invention.

Along the same lines, it has been observed in the examples that follow that an esterification performed on a relatively inactive silica gel with a small specific surface cannot be activated by injecting, e.g., titanic esters into the silica gel.

On the other hand, it is the more surprising that one can reactivate the silica gel contacts which are activated with, e.g., titanic esters or aluminates and are of high strength, after a long transmission time, by an annealing in the air flow at 300° to 700°C, and preferably at 500° to 600°C. Here it was to be expected that under these conditions the very unstable titanic esters, aluminates respectively, immediately change into the little active $TiO_2$, $Al_2O_3$ respectively. Indeed, French Pat. No. 2,010,775 discloses that the catalyst carrier obtained therein is impregnated with solutions of vanadium compounds, e.g., with a potassium vanadate solution, and is thereafter annealed at 500°C (whereby, out of the vanadates, fundamentally $V_2O_5$ results) in order to produce the well known $V_2O_5$ catalysts for the Knietsch-sulfuric-acid-process. By this process, well known sulfur dioxide bearing roasting gases from the pyrites oven, are oxidized. The transformation of $SO_2$ with $O_2$ requires, because of the inertness of the gas molecules, the accelerating action of the heat. Since, however, at over 430°C, the trioxide breaks down, reversely, into $O_2 + SO_2$, contact substances must be used that catalyze the process at low temperatures with the necessary speed. Heretofore the catalyst used for many decades now, has been $V_2O_5$ precipitated on pumice stone or clay which, at 425°C, unusually accelerates the $SO_3$ formation. (See, K. A. Hoffmann, "Anorganische Chemie," 12 Ed., p. 155, lines 1 + 2).

According to the variation disclosed in French Patent 2,010,775 the production of such sulfuric acid catalyst by the impregnation of a porous carrier with active vanadium oxides, does undoubtedly not allow for the conclusion that particularly effective esterification catalysts are obtainable by impregnating silica gel pearls with the above-mentioned compounds and that they can be reactivated in the air by annealing, and especially that with this annealing process the formation of the oxides which are inactive for the esterification reaction, would be expected.

Specific embodiments of the preparation of the esterification catalysts of the present invention and the new and unexpected results obtained therewith are illustrated in the following examples.

EXAMPLE 1.

106 g of an alkaline sodium aluminate solution which contains 7.56 percent by weight aluminum, is diluted with 894 g of $H_2O$ and to the resulting solution are added 800 g of silica gel pearl catalyst, of 1 to 3 mm, produced according to French Pat. No. 2,010,775, and this mixture is allowed to stand for 12 hours. The pearls absorb 500 g of the solution. The remaining solution is poured off and the pearls are dried at 50° to 100°C in a vacuum drying chamber. 0.5 percent by weight Al is absorbed. Before the charge, the catalyst is gassed with a mixture of $CH_3OH/H_2O$ (3:1) at a temperature of 150°C.

For the esterification, the test apparatus and method are of the type described above and shown in FIG. 1. Charging composition: 100 g terephthalic acid mixed with 240 g silica gel catalyst, gassing with 100 g methanol at 300°C, testing duration 12 minutes.

|  | I<br>Silica gel,<br>in<br>particles<br>1 to 3 mm,<br>fine-pored,<br>not impregnated | II<br>Silica gel, cylindrical according to French Pat.<br>2,010,775<br>1 to 3 mm<br>not impregnated | III<br>Silica gel of<br>column<br>II<br>impregnated<br>with<br>0.5% Al |
|---|---|---|---|
| Discharge g | 70.5 | 19 | 62.7 |
| SZ mg KOH/g | 115 | 150 | 102 |
| DMT %-weight | 62.92 | 52.7 | 67.04 |
| MMT %-weight | 37.08 | 47.3 | 32.96 |
| TPS %-weight | — | — | — |
| DMT g | 44.4 | 10.0 | 42.0 |
| MMT g | 26.1 | 9.0 | 20.7 |
| TPS g | — | — | — |
| Waste gas l<br>(dimethyl ether) | 4 | 4 | 5 |

EXAMPLE 2.

The cylindrical silica gel catalyst of Example 1 is impregnated with an aqueous zinc acetate solution with 2 percent by weight Zn (1.2 parts solution by weight to 1 part pearl contact by weight) whereby 1 percent zinc is absorbed. After the drying and the subsequent gassing with $CH_3OH/H_2O$ at 150°C, the following values are measured in the activity test:

| Discharge | g | 63.5 |
|---|---|---|
| SZ | mg KOH | 158 |
| DMT | % weight | 46 |
| MMT | % weight | 54 |
| TPS | % weight | — |
| DMT | g | 29.2 |
| MMT | g | 34.3 |
| TPS | g | — |
| Waste Gas<br>(dimethylether) | l | 6 |

EXAMPLE 3.

To a solution of 7.20 parts by weight of titanic tetra-n-propylate in 105 parts by weight of n-hexane, are added, at room temperature, 100 parts by weight of silica gel pearl catalyst, 1 to 3 mm, produced according to French Pat. No. 2,010,775. After 6 hours, the remaining solution which only has a Ti-content <0.1 percent, is poured off and the pearl catalyst is dried at 70° to 80°C. The dried pearl catalyst has a titanium content of 1.22 percent. When this impregnated catalyst is fed into the esterification oven, a relatively rapid loss of titanium is observed. By gassing the dried contact with $CH_3OH/H_2O$ (3:1) at 150°C, within 2 hours a hydrolysis of the titanic acid ester results and, simultaneously, a hardening of the titanium compound in the contact takes place.

The esterification apparatus, charging composition, temperature, transmission time are as described in Example 1.

|  |  | Silica gel, cylindrical, according to French Patent 2,010,775<br>1 to 3 mm<br>not impregnated | Impregnated with 1% Ti | Impregnated with 1% Ti<br>(5th charge) |
|---|---|---|---|---|
| Discharge | g | 19 | 85 | 90 |
| SZ | mg KOH/g | 150 | 84.6 | 57.4 |
| DMT | % weight | 52.7 | 72.82 | 81.4 |
| MMT | % weight | 47.3 | 21.18 | 18.6 |
| TPS | % weight | — | — | — |
| DMT | g | 10 | 62.2 | 73.3 |
| MMT | g | 9 | 22.8 | 16.7 |
| TPS | g | — | — | — |
| Waste gas<br>(dimethyl ether) | l | 4 | 4 | 5 |

EXAMPLE 4.

Figure 2:
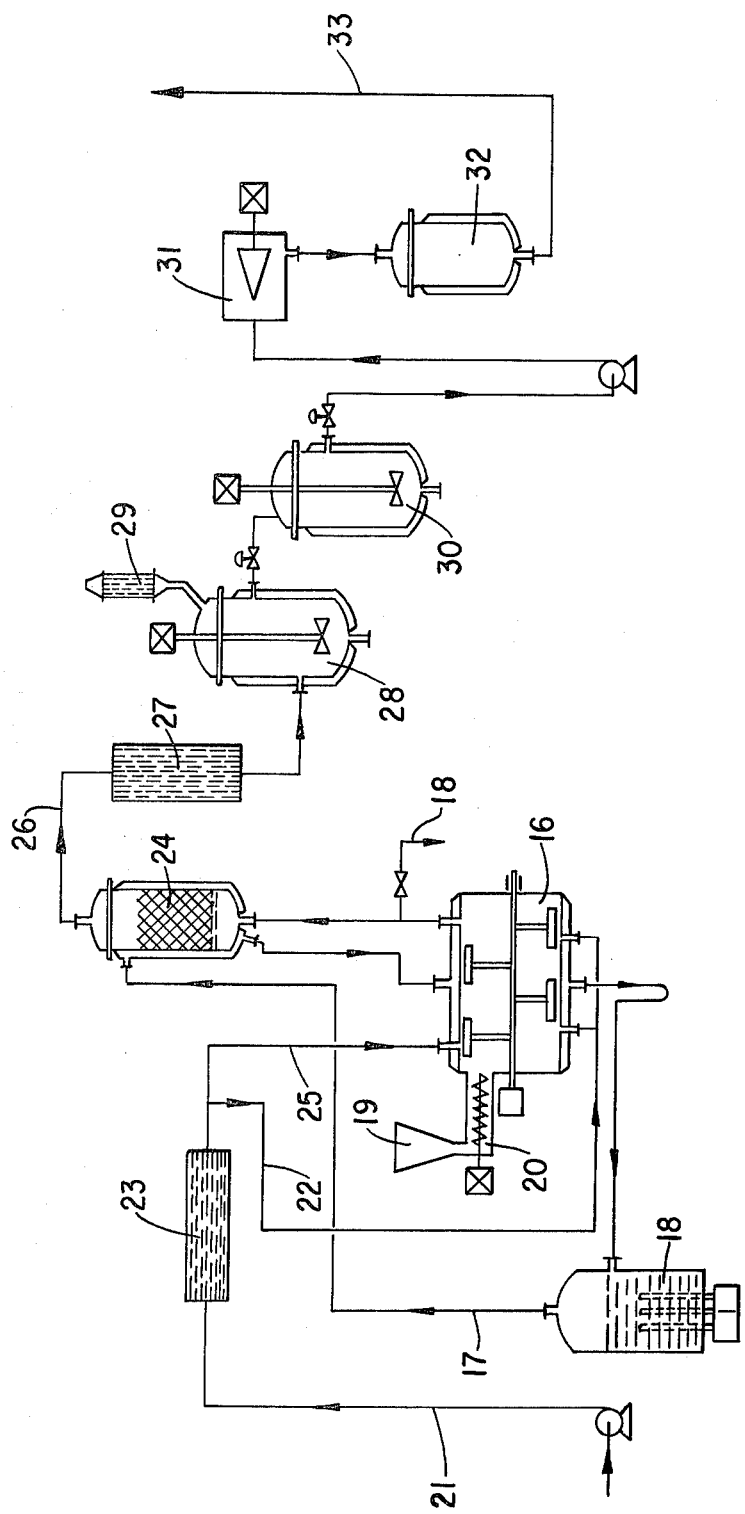
FIG. 2 is a diagrammatic representation of a fluidized bed esterification apparatus for the continuous esterification of terephthalic acid with methanol.

For the continuous esterification of terephthalic acid with methanol, the apparatus of FIG. 2 is used:

Into a horizontally positioned rotary oven 16, fitted with a blade system and a double wall having a volume of approximately 600 liters, and heated by heat-carrying steam 17 heat-carrying stem generator 18 to approximately 320°C, and loaded with 240 liters of a cylindrical silica gel which, by adding filling materials, is very abrasion-free and thermally stable (produced according to French Pat. No. 2,010,775), pulverulent terephthalic acid is fed from the hopper 19 through a double worm 20 at a velocity of 43 (53) kg/h. Parallel thereto, superheated methanol 21 (methanol superheater 23) of approximately 340°C is fed in by a nozzle via tube 25 at a velocity of 129 (159) kg per hour. By choice, the stream of the superheated methanol can be partially injected at the bottom of the rotary oven. In the oven, a temperature of 290°, 265°C respectively, is established. In the after fixed silica gel bed of solids 24 which is loaded with 700 liters of silica pearls (=460 kg), the esterification reaction is brought to an end, whereby the necessary reaction heat is injected into the system by condensing the heat-carrying steam at 350°C.

The gaseous reaction mixture (26) coming out of the after reactor 24, consists of DMT, reaction water and methanol, and is cooled, in the after positioned condenser 27 under the generation of low pressure steam, to 160°C, and is from there fed into an agitator vessel (dispersing agitator 28) filled with methanol. Herein the boiling methanol is condensed in a condenser 29 which is installed on the dispersing agitator 28, and led back into the agitator. The suspension formed of dimethyl terephthalate in methanol (approximately 30 percent DMT) is cooled to approximately 10°C in a second agitator vessel (sol agitator 30) and, in a centrifuge 31, separated into solids and mother liquor. The still moist methanol filter cake of the centrifuge is carried into the melting pot 32 which is kept at a temperature of from 170° to 190°C. From there, the melted crude ester (SZ = 1, FP : 140°C) is fed into the DMT purifying distillation line 33. Between the fluidized bed, rotary oven 16 and the silica gel bed of solids 24, a nozzle 34 is installed which makes it possible to take specimens of the reaction stream coming out of the rotary oven during the continuous esterification. Based on the analytical data of this reaction discharge, the discharge of the esterification in the rotary oven (terephthalic acid transformation) can be continuously measured, and, thereupon, an evaluation can be made about the activity of the catalyst.

In order to obtain a comparison of the catalyst activities, the analytical values of the reaction discharge (nozzle 34) of a continuous esterification with the unimpregnated pearl catalyst of foregoing quality, are indicated. According to this comparative esterification, a part of the methanol vapor stream is periodically fed in at the bottom of the rotary oven, and, therewith, particularly favorable esterification conditions are established.

| Operating hours: | | 10 | 30 | 35 | 45 |
|---|---|---|---|---|---|
| CH$_3$OH | kg/h | 129 | 129 | 129 | 129 |
| of this, CH$_3$OH from below | kg/h | 70 | 70 | — | — |
| TPS | kg/h | 43 | 43 | 43 | 43 |
| Temp. Rotary Oven (16)°C | | 286 | 287 | 292 | 291 |
| Test from the rotary oven: | | | | | |
| SZ (Acid number) | mg KOH/g | 493 | 529 | 556 | 560 |
| TPS | % weight | 68.0 | 75.7 | 84.1 | 85.2 |
| MMT | % weight | 17.9 | 10.9 | 11.5 | 9.0 |
| DMT | % weight | 14.1 | 13.4 | 4.4 | 5.3 |
| TPS-Transformation | % weight | 32.0 | 24.3 | 15.9 | 14.8 |
| TPS-Transformation | kg | 13.7 | 10.4 | 6.8 | 6.4 |

The esterification was then conducted with the same pearl catalyst that was by this time impregnated with titanic acid ester. The impregnation of the contact with titanium tetra-n-propylate was conducted according to the method given in Example 1, whereby the concentrations were so chose that the titanium contact of the impregnated, dry contact is 1.8 percent, before the hydrolysis, and 1.57 percent after the gassing with a mixture of CH$_3$OH/H$_2$O (3:1) at 150°C within 2 hours.

| Operation hours | | 11 | 12 | 35 | 37 | 40 | 60 | 80 | 150 | 175 |
|---|---|---|---|---|---|---|---|---|---|---|
| CH$_3$OH | kg/h | 129 | 129 | 129 | 159 | 159 | 159 | 129 | 129 | 129 |
| of this, CH$_3$OH from below | kg/h | — | — | — | — | — | — | — | — | — |
| TPS | kg/h | 43 | 43 | 43 | 53 | 53 | 53 | 43 | 43 | 43 |
| Temperature Rotary Oven (16) | °C | 260 | 260 | 250 | 260 | 260 | 262 | 265 | 264 | 266 |
| Test from Rotary Oven: | | | | | | | | | | |
| SZ (Acid number) | mg KOH/g | 58 | 67 | 60 | 149 | 156 | 141 | 88 | 115 | 102 |
| TPS | % weight | 10.1 | 8.4 | 9.9 | 20.2 | 21.5 | 21.0 | 11.6 | 15.3 | 12.0 |
| MMT | % weight | 13.5 | 15.8 | 10.6 | 9.5 | 9.9 | 11.5 | 10.6 | 16.8 | 11.3 |
| DMT | % weight | 76.4 | 75.8 | 79.5 | 70.3 | 68.6 | 67.5 | 77.8 | 67.9 | 76.7 |
| TPS Transformation | % weight | 89.9 | 91.6 | 90.1 | 79.8 | 78.5 | 79.0 | 88.4 | 84.7 | 88.0 |
| TPS Transformation | kg | 38.6 | 39.4 | 38.8 | 42.3 | 41.6 | 41.8 | 38.0 | 36.4 | 37.8 |

The comparison of the analytical data of the continuous esterification of solid terephthalic acid with gaseous methanol in the presence of cylindrical silica gel which is (1) unimpregnated, and (2) impregnated, shows, in accord with the cited discontinuous experiments, that with the impregnation of the catalyst a very strong activation can be accomplished. Even by raising the load from 43 to 53 kg/h (37. to 60. operating hour), the SZ (Acid Number) of the discharge after the rotary oven is relatively low when the activated catalyst is injected. Furthermore, it is interesting to observe that, with the increase of the transformation by using the impregnated catalyst, simultaneously the reaction temperature decreases substantially, i.e., under the chosen esterification conditions, a very much higher temperature decline sets in between the heating surfaces and the reaction material.

After an operating time of 175 hours, the catalyst loss in the rotary oven amounts to 0.5 kg, i.e., there is practically no catalyst abrasion to be ascertained.

The titanium content in new catalyst is 1.57 percent, and after an operating period of 175 hours, it is 1.56 percent, which is practically unchanged.

These values (abrasion/titanium) are confirmed by a continuous esterification in commercial installations, even after long operating periods. By injecting a catalyst with 1.44 percent of titanium, after 42 days the titanium content is 1.41 percent and the contact-loss by abrasion can be practically disregarded.

EXAMPLE 5.

After a longer operating time, a slackening of the activity of the catalyst (clogging of the pores and covering of the surface with impurities) can be observed. Through an annealing of the used catalyst at 600°C in an air stream, this catalyst can be reactivated in a simple manner:

Esterification method as described above in Example 4.

100 g TPS/240 g catalyst, 100 g methanol, 300°C/12 minutes.

COMPARISON EXAMPLE 6

The method of reactivating, by burning off, wherein fine-pored material which contains 6.5 to 7.5 percent water is used, leads to the following results.

| | | Silica gel, in particles, fine-pored, 1–3 mm, unimpregnated | | |
|---|---|---|---|---|
| | | Fresh contact | Used contact | After annealing |
| Discharge | g | 70.5 | 55 | 50 |
| SZ | mg KOH/g | 115 | 100 | 170 |
| DMT | % by weight | 62.92 | 67.8 | 45.6 |
| MMT | % by weight | 37.08 | 32.2 | 54.6 |
| TPS | % by weight | — | — | — |
| DMT | g | 44.4 | 37.3 | 27.3 |
| MMT | g | 26.1 | 17.7 | 22.7 |
| TPS | g | — | — | — |
| Waste gas (dimethyl ether) | l | 4 | 4 | 4 |

Test result: Used, fine-pored silica gel contact cannot be reactivated through a burning-off process.

COMPARISON EXAMPLE 7.

The rotary oven according to FIG. 2 is charged with 240 liters (= 170 g) unimpregnated pearl catalyst and the esterification is carried out under the usual conditions whereby a part of the methanol is injected at the bottom of the rotary oven 22. After an operating time of 20 hours, the methanol vapor entering at the bottom of the rotary oven, is mixed with a solution of titanium-tetra-n-propylate, so that within 2 hours, relative to the catalyst, a concentration of 1 percent Ti must be reached. After 15 hours, once again in the course of 2 hours, titanic esters are injected so that a total concentration of 1.7 percent Ti, relative to the catalyst, must be present.

| | Silica gel, cylindrical, according to French Patent 2,010,775, 1 to 3 mm | | | |
|---|---|---|---|---|
| | | Fresh catalyst: 1.44% Ti | after 42 days: 1.41 Ti | after annealing |
| Discharge | g | 91 | 26 | 88.3 |
| SZ | mg KOH/g | 81 | 112 | 104 |
| DMT | % weight | 76.9 | 64.0 | 69.7 |
| MMT | % weight | 23.3 | 36.0 | 30.3 |
| TPS | % weight | — | — | — |
| DMT | g | 70.0 | 16.6 | 61.6 |
| MMT | g | 21.0 | 9.4 | 26.7 |
| TPS | g | — | — | — |
| Waste gas (dimethyl ether) | l | 4 | 6 | 4 |

| Test conditions | | | | | | | | | | | |
|---|---|---|---|---|---|---|---|---|---|---|---|
| Operating hours | | 15 | 20 | 21 | 22 | 25 | 30 | 35 | 36 | 40 | 45 |
| CH₃OH | kg/h | 129 | 129 | 129 | 129 | 129 | 129 | 129 | 129 | 129 | 129 |
| of this, CH₃OH from below | kg/h | 80 | 80 | 80 | 80 | 80 | 80 | 80 | 80 | 80 | 80 |
| TPS | kg/h | 43 | 43 | 43 | 43 | 43 | 43 | 43 | 43 | 43 | 43 |
| Ti-tetra-n-propylate | kg/h | — | — | 5 | 5 | — | — | 3.5 | 3.5 | — | — |
| temperature in rotary oven | °C | 291 | 292 | 289 | 290 | 292 | 293 | 292 | 290 | 294 | 294 |
| Tests from the rotary oven | | | | | | | | | | | |
| SZ | mg KOH/g | 424 | 431 | — | — | 352 | 380 | — | — | 360 | 375 |
| TPS | % weight | 58.3 | 63.1 | — | — | 44.6 | 50.5 | — | — | 48.0 | 50.0 |
| MMT | % weight | 13.1 | 12.8 | — | — | 8.8 | 12.4 | — | — | 12.0 | 11.0 |
| DMT | % weight | 28.6 | 24.1 | — | — | 46.6 | 37.1 | — | — | 40.0 | 39.0 |
| TPS transformation | % weight | 41.7 | 36.9 | — | — | 55.4 | 49.5 | — | — | 52.0 | 50.0 |
| TPS transformation | kg | 17.9 | 15.9 | — | — | 23.7 | 21.3 | — | — | 22.4 | 21.5 |

The data of the analyses confirm that no satisfactory transformation can be accomplished with the injection of the titanic ester. The testing of the disassembled catalyst additionally shows that the silicic catalyst has not absorbed any titanium (Ti = 0.082%). On the other hand, the total titanium is recovered in the discharged ester.

By using instead of titanium-tetra-n-propylate (Example 3) titanic tetraethyl ester (I), titanic tetraisopropyl ester (II), titanic tetrabutyl ester (III), titanic tetraisobutyl ester (IV), practically the same results are reached:

|     | Discharge g | SZ mg/KOH |
| --- | --- | --- |
| I   | 81 | 75 |
| II  | 86 | 63 |
| III | 79 | 75 |
| IV  | 88 | 81 |

Also, a high esterification activity is established by impregnating the pearl contact made according to French Pat. No. 2,010,775 with stannic tetraethyl ester whereby the prepared contact contains 1.4 percent tin:

| Discharge g | SZ |
| --- | --- |
| 78 | 74 |

EXAMPLE 8.

The commercial trimethyl adipic acid (TMA) used has the following composition:

| TMA (isomeric ratio 2.2.4/2.4.4 → 40/60 | 90 | percent by weight |
| --- | --- | --- |
| Trimethyl glutaric acid | 5.5 | percent by weight |
| Dimethyl succinic acid | 3.5 | percent by weight |
| Dimethyl malonic acid | 0.5 | percent by weight |
| $H_2O$ | 0.4 | percent by weight |

Esterification Apparatus (according to FIG. 1)

The esterification reactor has a vertical tube 1, diameter = 50 mm, length = 1,000 mm, with a filter plate 2 whereupon is found a layer of "Raschig" rings or glass beads 3. Thereupon, approximately 1 liter silica gel catalyst 4 is poured. The upper part of the tube is also filled with Raschig rings or glass beads, and serves as pre-heater (thermometer 10). The tube is heated with an electric heater 5. From the reservoir 7, a solution of TMA in $CH_3OH$ (proportion by weight 1:3) is fed in over a funnel metering pump (8) in the heat transfer oil heated pre-heater 9 and from there into the reaction tube. The discharge is caught in the funnel flask 11, and the boiling methanol is condensed in the cooler 12. The quantity of the eventually appearing, low boiling cleavage products is measured in the rear position gas meter 13.

a Esterification in the presence of commercial silica gel, fine-poured, 1 to 3 mm (Brothers Hermann, Cologne, type E).

At a reactor temperature 6 of 300°C, a solution of TMA in $CH_3OH$ (proportion by weight 1:3) is fed in from the supply vessel over the pre-heater (9 + 10, $t$ = 150°C) whereby the to-be-dosed mixtures, in the process of the test, are changed between 100 and 500 g/h. An active esterification and simultaneously, however, also an extensive decomposition (e.g. decarboxylizing) of TMA, independently of the added mixture, are observed. The acid number of the analytically not defined discharge is, after the separation of the methanol, 210. By repeating the test at a reactor temperature of 200°C, indeed no decomposition of TMA is observed, but the catalyst is also practically inactive at a low load (100 g solution/h). Discharge, methanol-free, SZ = 491.

b. Esterification in the presence of impregnated silica gel pearls, made according to French Pat. No. 2,010,775.

The esterificator reactor is filled with 1 liter (= 720 g) of silica gel pearl catalyst which is impregnated with titanic tetrapropylate and which contains 1.2 percent Ti after the preparation and gassing with aqueous methanol vapor. From the supply vessel 7, per hour 300 g of methanol solution containing 100 g TMA is fed in over the pre-heater (9 + 10, T = 150°C) at a temperature of 180° to 190°C in the catalyst layer (10). Ascertained is an almost quantitative esterification without decomposition of TMA. The discharge freed from methanol has an SZ = 7. Under the cited conditions, the esterification is continuously performed over a period of 150 hours, without any noticeable decrease in the activity of the catalyst. No Ti (<1 ppm) is found in the esterification discharge and, accordingly, the titanium content is, after 150 hours, unchanged: 1.2 percent. The methanol-free esterification discharge is distilled in a 50 cm column filled with Raschig rings ($T_{sump}$ : 150°C, $T_{head}$ : 120°–125°C, p = 20(Torr mm $H_g$). The output in trimethyl adipic acid dimethyl ester, relative to the injected TMA, is 85 percent of the theoretical.

We claim:

1. In the method for preparing active, highly abrasionfree and mechanically stable silica gel esterification catalysts from an inorganic oxide gel obtained by forming a hydrosol or inorganic oxide characterized by an inherent capacity to set to a hydrogel upon the lapse of a suitble period of time without addition to or subtraction from said sol of any substance, admitting said sol in the form of separate globules to a body of a fluid medium substantially immiscible with water in which said globules assume spherical shape due to surface tension at the interface between said sol and said fluid medium, said medium being maintained at a temperature below the boiling point of said sol, retaining said spheriodal globules in said medium until gelation occurs, retaining in said globules substantially all the constituents of said sol until gelation occurs, washing the spheroidal hydrogel and drying the washed hydrogel, the improvement comprising:
  a. impregnating said inorganic oxide gel with a solution of a metallic compound selected from the group consisting of aluminum organic compounds having 3 to 18 carbon atoms, sodium aluminate, potassium aluminate, titanium organic compounds having 4 to 24 carbon atoms, zinc organic compounds having 2 to 12 carbon atoms and tin organic compounds having 4 to 24 carbon atoms;
  b. removing excess solution; and
  c. drying the impregnated inorganic oxide gel to form said active, highly abrasion-free and mechanically stable silica gel esterification catalysts.

2. In the method for preparing active, highly abrasion-free and mechanically stable silica gel esterification catalysts from an inorganic oxide gel obtained by suspending a solid in an aqueous stable silicon dioxide sol with a specific surface area of 150 to 400 m²/g, which solid comprises
  1. a silicon dioxide filter with a specific surface area of from 20 to 200 m²/g in quantities of from 20 to 60 percent by weight, and
  2. an argillaceous mineral selected from the group consisting of kaolinite, montmorillonite and attapulgite in quantities from 5 to 30 percent by weight, based on the total solids in the sol; mixing the resulting suspension with hydrated magnesium oxide in quantities of from 0.1 to 3 percent by weight based on the total solids in the sol; dividing the resulting gelable mixture in droplet formm in a waterimmiscible liquid to effect gelation of the droplets; separating the dry solid material from the liquid and drying and heating the resulting bead-like granulated material for at least ten minutes at temperatures of from 500 to 1000°C, the improvement comprising:
  a. impregnating said inorganic oxide gel with a solution of a metallic compound selected from the group consisting of aluminum organic compounds having 3 to 18 carbon atoms, sodium aluminate, potassium aluminate, titanium organic compounds having 4 to 24 carbon atoms, zinc organic compounds having 2 to 12 carbon atoms and tin organic compounds having 4 to 24 carbon atoms;
  b. removing excess solution; and
  c. drying the impregnated inorganic oxide gel to form said active, highly abrasion-free and mechanically stable silica gel esterification catalysts.

3. The method of claim 1, wherein said aluminum organic compounds are selected from the group consisting of trimethyl aluminum, triethyl aluminum, tri-isopropyl aluminum, tri-n-propyl aluminum, tributyl aluminum, trimethyl aetherate aluminum, triethyl etherate aluminum, tripropyl etherate aluminum, triphenyl aluminum, tri-p-tolyl aluminum, tri-p-tolyl aluminum etherate, lithium aluminum ester of methanol, lithium aluminum ester of ethanol, lithium aluminum ester of propanol, and lithium aluminum ester of butanol; said titanium orgnaic compounds are selected from the group consisting of titanic tetramethyl ester, titanic tetraethyl ester, titanic tetrapropyl ester, titanic tetraisopropyl etser, titanaic tetrabutyl ester, titanic-2-ethylehexyl ester, titanic ethylglycol ester, Na H T (OC$_4$H$_9$)$_6$ and tetraisopropylic titanium; said zinc organic compounds are selected from the group consisting of zinc acetate, zinc propionate, zinc butyrate, zinc dimethyl, zinc diethyl, zinc dipropyl, zinc dibutyl, zinc diamyl, ethyl-n-propyl zinc, ethyl-isobutyl zinc, n-propyl-isobutyl zinc, isobutyl-isoamyl zinc, zinc diphenyl, zinc ditrolyl and zinc betanaphthyl; said tin organic compounds are selected from the group consisting of tin tetramethyl, tin tetraethyl, tin tetrapropyl, tin tetraoctyl, tin tetraacetate, tin tetrapropionate, tin tetrabutyrate, tin trimethylethyl, tin trimethylpropyl, tin triethylpropyl, tin triethylisopropyl, tin tri-n-propyl-isobutyl, tin-n-amyl-n-propyl, tin tetraphenyl, tin tetratolyl, tin tetraxylol, (C$_4$H$_9$)$_3$ Sn OH, (C$_4$H$_9$)$_2$ SnO, (C$_4$H$_9$)$_2$ Sn(OOC-CH$_3$)$_2$, (C$_4$H$_9$)$_2$ Sn OCHOhd 3 and (C$_4$H$_9$)$_3$ Sn OC$_2$H$_5$.

4. The method of claim 1, wherein said aluminum organic compounds are selected from the group consisting of trimethyl aluminum, triethyl aluminum, tri-isopropyl aluminum, tri-n-propyl aluminum, tributyl aluminum, trimethyl etherate aluminum, triethyl etherate aluminum, tripropyl etherate aluminum, triphenyl aluminum, tri-p-tolyl aluminum, tri-p-toyl aluminum etherate, lithium aluminum ester of methanol, lithium aluminum ester of ethanol, lithium aluminum ester of propanol, and lithium aluminum ester of butanol; said titanium organic compounds are selected from the group consisting of titanic tatramethyl ester, titanic tetraethyl ester, titanic tetrapropyl ester, titanic tetraisopropyl ester, titanic tetrabutyl ester, titanaic-2-ethylhexyl ester, titanic ethlglycol ester, Na H T (OC$_4$H$_9$)$_6$ and tetraisopropylic titanium; said zinc organic compounds are selected from the group consisting of zinc acetate, zinc propionate, zinc butyrate, zinc dimethyl, zinc diethyl, zinc dirpopyl, zinc dibutyl, zinc diamyl, ethyl-n-propyl zinc, ethyl-isobutyl zinc, n-propyl-isobutyl zinc, isobutyl-isoamyl zinc, zinc diphenyl, zinc ditrolyl and zinc betanaphthyl; said tin organic compounds are selected from the group consisting of tin tetramethyl, tin tetraethyl, tin tetrapropyl, tin tetraoctyl, tin tetraacetate, tin tetrapropionate, tin tetrabutyrate, tin trimethylethyl, tin trimethylpropyl, tin triethylpropyl, tin triethylisopropyl, tin tri-n-propyl-isobutyl, tin-n-amyl-n-propyl, tin tetraphenyl, tin tetratolyl, tin tetraxylol, (C$_4$H$_9$)$_3$ Sn OH, (C$_4$H$_9$)$_2$ SnO, (C$_4$H$_9$)$_2$ Sn(OOC-OH$_3$)$_2$, (C$_4$H$_9$)$_2$ Sn OCH$_3$ and (C$_4$H$_9$)$_3$ Sn OC$_2$H$_5$.

5. The esterification catalysts obtained by the method of claim 1.

6. The essterification catalysts obtained by the method of claim 2.

7. The method of claim 1 wherein said esterification catalysts are reactivated by annealing in an airstream.

8. The method of claim 7, wherein said annealing takes place at about 300° ti 700°C.

9. The method of claim 1, wherein said hydrogel has initially dispersed therein a particulate filler material having a weight means particle diameter of between 1 and 5 microns.

10. The method of claim 9, wherein said particulate filler material has a weight means particle diameter of between 2 and 4 microns.

11. The method of claim 1, wherein said solution contains about 0.01 to 8 percent by weight of said metallic compound based upon the weight of the metal therein.

12. The method of claim 1, wherein the overall combination of said metallic compound: solvent: catalyst in parts by weight include 0.5 to 50 parts by weight of said solvent: 400 to 1200 parts by weight of catalyst.

13. The method of claim 1, wherein said drying of step (c) takes place in a vacuum.

14. The method of claim 1, further comprising treating said esterification catalysts produced in step (c) with aa gaseous mixture of methanol and water for about 30 to 300 minutes at a temperature of about 100° to 200°C.

* * * * *